Patented Apr. 24, 1951

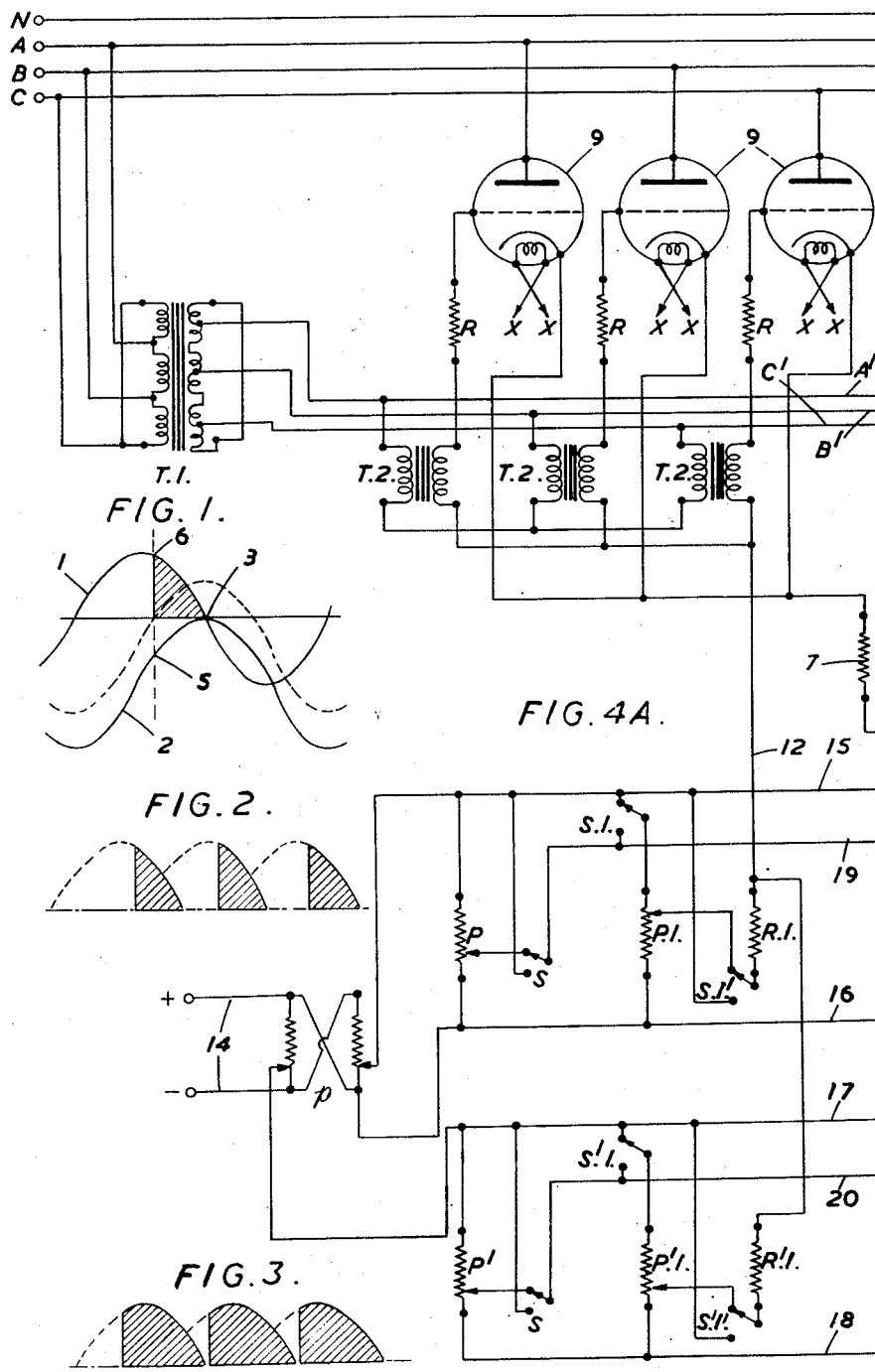

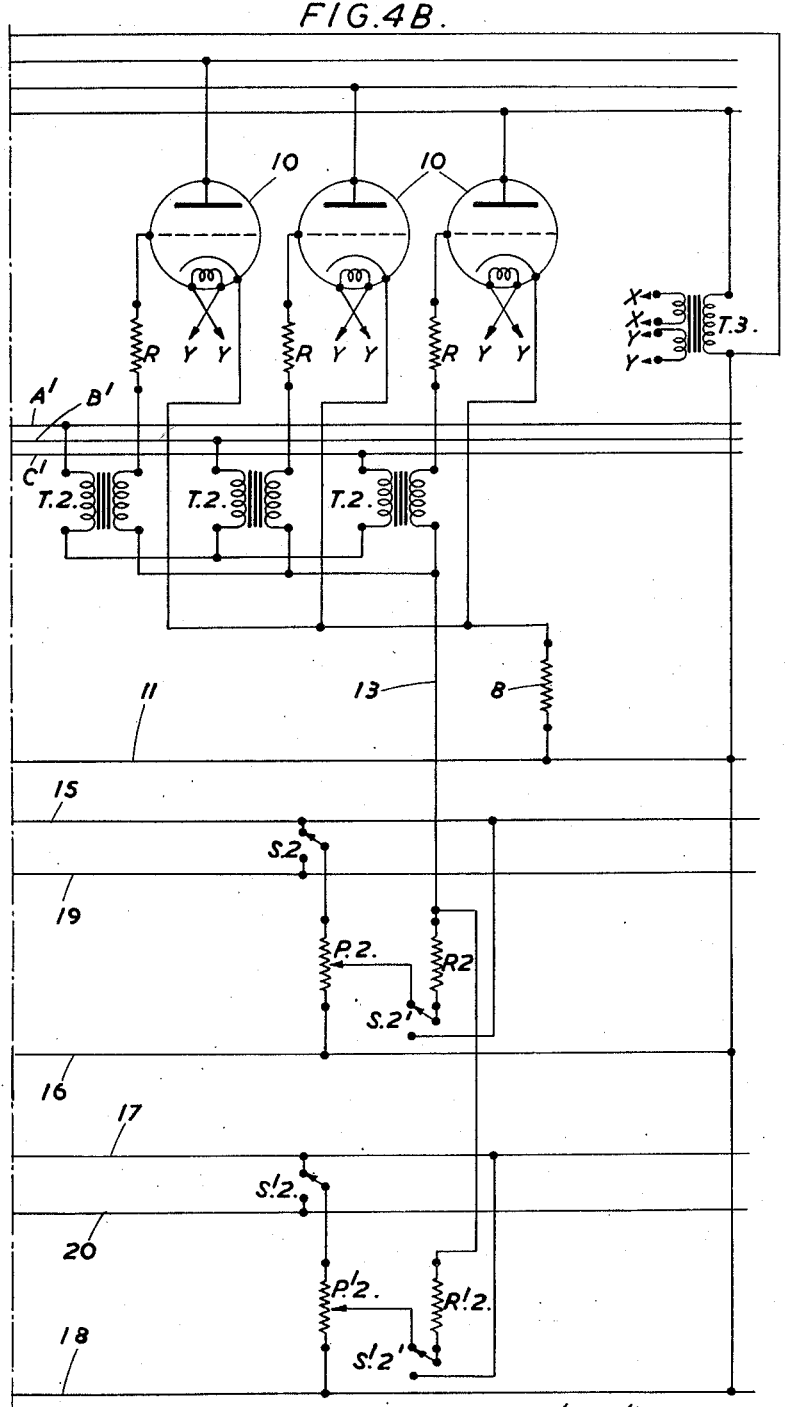

2,550,317

UNITED STATES PATENT OFFICE 2,550,317

CONTROL OF STAGE, DECORATIVE, OR SIMILAR LIGHTING APPARATUS

James Templeton Wood, London, England, assignor to The Strand Electric and Engineering Company Limited, London, England, a British company Application April 4, 1949, Serial No. 85,404
In Great Britain April 15, 1948

2 Claims. (Cl. 315—250)

The present invention relates to stage, decorative or similar lighting apparatus and in particular to the control of dimmers whereby the degree of brilliancy of a lamp or bank of lamps is varied in more-or-less gradual fashion.

Hitherto such dimming effects have been secured by the use of dimming resistances in series with the various banks of lamps and controlled by heavy-duty switchgear, but, especially in the case of extensive effects demanded in connection with modern stage lighting, such apparatus is apt to become very costly, complicated, and cumbersome. Also it is frequently desired that it shall be possible to pre-set the dimming apparatus so that its effect may be introduced at a given moment and its operation shall then proceed without further attention. It has, however, been found that in all but the smallest installations the complications of the apparatus required to produce such pre-set effects is prohibitive. Further, when the lighting is fed from polyphase mains, official regulations require that the load shall be balanced as between the various phases and, especially seeing that the minimum distance between apparatus connected to different phases is prescribed, difficulties which have hitherto proved virtually insurmountable, at least in connection with large installations, have arisen in complying with the official regulations. It is the main object of the present invention to overcome these various drawbacks and other difficulties which have been encountered and to provide an apparatus of the kind set forth of far greater simplicity than that hitherto proposed. Further, control independent of the load up to the full limit of the power-handling capacity of the apparatus is secured. Also, in the case of polyphase supplies, not only is load balance between the phases attained, but the voltage across the load can never exceed that between one phase and neutral, a condition which overcomes the disadvantage arising from limitation of distance between items of apparatus mentioned above.

According to the invention, in stage-lighting or analogous equipment the lighting load is fed from an alternating-current supply through one or more thermionic valves, each of which is provided in its grid circuit with controlling means whereby the load transmitted through the valve is regulated. In practice, the type of valve known as the thyratron, that is to say, a gas-filled triode, is found to be most suitable for the purpose of the invention. In the case in which a supply is drawn from polyphase mains, a corresponding number of valves is used; the most common instance is, of course, that of a three-phase supply in connection with which three valves would be employed, the anodes being connected to the respective phases and the cathodes to a common point constituting one of the load terminals, the other terminal of the load being connected to a neutral conductor.

For the purpose of controlling each valve a system as described with reference to Figure 1 of the drawings accompanying this specification may be used. In this figure the voltage applied to the anode is represented by the curve 1, assumed to be approximately of sine form. To the grid circuit of the valve there is connected an alternating-current supply of the same frequency as that of the supply to the anode but lagging by 90°, this being represented in Figure 1 by the voltage curve 2. The valve is of such a nature as to become conductive when the voltage on its anode is positive, the valve cutting off at the end of each half-cycle at which the anode ceases to become positive and becomes negative unless otherwise controlled by its grid. In the case represented in Figure 1, the striking action due to the grid voltage represented by the curve 2 first becomes possible at the instant represented at the point 3 at which the anode voltage has dropped to zero and is about to become negative, the corresponding voltage on the curve 2 being then a maximum. Due to the approximately sine form of the curve 2, however, if the striking point can be caused to travel backwards from the maximum point 3 to a point such as 5 the valve will strike at an earlier point, such as 6, in the half-cycle, and the possibility of transmission of power through the valve would be represented by the shaded area indicated on the curve 1. This effect is secured by the inclusion in the grid circuit of a D. C. supply in opposition to the positive impulses of the controlling voltage represented by the curve 2, and, by varying this opposing D. C. voltage, the point on the curve 2 at which the valve will be caused to strike may be altered. By suitably decreasing the D. C. voltage, thereby raising the curve 2 to the position shown dotted, the striking action takes place at the point represented at the point 5 on the curve 2, that is to say, at the point 6 on the anode voltage curve 1.

As an alternative method of control, instead of varying the D. C. voltage, the phase difference between the curves 1 and 2 might be altered in order to secure the required travel of the points 5 and 6 along these curves; or a combination of the above methods might be employed. As the positive peak of curve 2 should coincide in time with zero value of curve 1, if either or both of these curves were so distorted that the peak is not midway between successive zero values, the phase difference between the curves, apart from any regulating action, must be correspondingly varied from 90°.

As in the case of a three-phase supply there is a valve with its controlling grid circuit in each phase, the total effect as regards the anode circuit is represented in Figure 2, from which it will be seen that the load is balanced as between phases. It will be evident that if the point 5 on the curve 2 were advanced to the negative maximum of that curve, the valve would conduct throughout the whole of the positive half-cycle. From this it would follow that, in the case of three-phase supply, two valves would be conducting at the same time, and, accordingly, means, as described below, is provided so that no two of the valves can be operative simultaneously, such a contingency being undesirable as it would permit of an undue load current impulse. Thus, in the case of a three-phase supply, the conditions of maximum output of the regulating valves are depicted in Figure 3.

In order to allow for the possibility of pre-setting the apparatus so that, while it is carrying out a certain dimming operation, a further operation may be arranged for and subsequently put into action, whereupon its effect is carried out automatically, two or more sets of apparatus for supply of the above variable direct current may be provided, arrangements being made whereby, during the period that one such set is in operation, the other set or sets may be prepared for subsequent action and brought into circuit at the desired moment. In all but the smallest installations it has been found desirable to split the whole lighting apparatus into a series of sections or loads, each load being provided with a controlled thermionic valve or with two or more of such valves according to the nature of the supply. There may be associated with each of such valves or sets of valves, two or more sets of apparatus for the supply of variable direct current, and it is convenient to arrange such sets in two or more series or chains, means being provided for selectively connecting such chains to the main D. C. supply.

In effecting alteration in the conditions prevailing in one of the loads by switching the D. C. supply from one of the above chains to another in which a pre-setting operation has been effected, no change being desired in a given load, all that is necessary is to ensure that in respect of the latter load the pre-setting of the control apparatus in the second chain is the same as that in the first chain.

For a more complete understanding of the invention a diagrammatic representation of the essential features of a lay-out according to the present invention has been illustrated, by way of example, in Figure 4 of the drawings.

Referring to this figure, a three-phase supply whereof mains are indicated at A, B and C has been assumed. It has also been assumed that the total number of lamps to be supplied has been divided into two loads 7 and 8, each having a set of thyratrons 9 and 10 respectively. As indicated, the anodes of the thyratrons are connected respectively to the phases A, B and C, the cathodes being connected to a common point constituting one of the terminals of the load, whereof the other terminal is connected to a neutral conductor 11. For the purpose of impressing on the grids of the thyratrons an alternating-current supply of the same frequency as that applied to the anodes but lagging by 90°, an appropriate transformer T1 is connected to the three-phase mains and serves to supply transformers T2 whereof the secondary windings are connected to the grids respectively through resistances R. Such an arrangement for securing displaced alternating-current supply is well known and requires no further description. For the sake of completeness, there is shown a transformer T3 serving to supply the valve filaments, the connections being indicated by the use of the reference letters X and Y.

Direct current for control purposes is introduced into the grid circuit by a conductor 12 or 13, as the case may be, connected to the star point of the secondary windings of the transformers T2. The D. C. supply is obtained from mains 14 appropriately furnished from any suitable source, such, for instance, as a rectifier actuated from the alternating-current mains. In respect of each of the loads 7 and 8 there is provided apparatus for supplying variable direct current via the lead 12 or 13, as the case may be, such apparatus being, in the example illustrated, duplicated for the purpose above specified. For convenience of description these sets of apparatus will be referred to as the first and the second set respectively, and it will be noted that in respect of each load the first set is connected between supply leads 15 and 16, and the second set between leads 17 and 18. Thus the various first sets corresponding to the different loads constitute a series or chain and the second sets a further series or chain, means being provided for the connection of the D. C. mains to either of the chains and for a gradual change over from one chain to the other. Such means comprises a double-ganged potentiometer $p$ and it will be appreciated that, in the position shown, D. C. power is connected to the leads 17 and 18 but that both the leads 15 and 16 are joined to the positive pole. On the other hand, if the movable contacts of the ganged potentiometer are reversed, the leads 15 and 16 will be excited and the leads 17 and 18 will both become connected to the positive pole. The leads 16 and 18 are connected to the neutral lead 11; the voltage drop across the load, which is connected between neutral and the cathodes, is thus also used to oppose the voltage supplied by the transformer T2, and since from the characteristics of the valve employed, when once the valve is conducting, an alteration of grid voltage has no effect, this voltage will not affect the valve which is conducting but will prevent the succeeding valve from striking before the first has cut off. It will be seen by referring to Figure 3 that, under normal conditions, there is no voltage developed across the load immediately prior to the operation of each valve.

In respect to each chain, there is connected across the supply leads 15 and 16, or 17 and 18, as the case may be, a potentiometer P or P'. There are also switches S or S' arranged to connect one of two leads 19, 20 either to the lead 15 or 17 or to the potentiometer P or P'. These items of apparatus are for the purpose of controlling the voltage applied to the respective chains, the potentiometer P or P' giving a gradual increase or decrease and corresponding to a master control in the normal form of switchboard, and the switches S or S' providing the immediate maximum voltage as in the case of a master "on" or "off" switch.

As the apparatus for supplying variable D. C. to each of the loads is precisely similar, that associated with the load 7 only will be described. The first set of such apparatus comprises a potentiometer P1 adapted, by means of a switch S1, to be connected either to the leads 15 and 16 or to the leads 19 and 16, thereby operating alternatively directly from the potentiometer p or through the potentiometer P. The potentiometer P1 feeds direct current through a comparatively high resistance R1 to the lead 12, communicating with the grid circuits of the thyratrons 9, a switch S1' however being interposed, whereby the supply lead 15 may be connected directly to the resistance R1, thus preventing the valves from conducting. The second set of D. C. control apparatus associated with the load 7 is precisely similar to the first set, comprising switches S'1, S'1', potentiometer P'1 and resistance R'1, the last-mentioned item being, as indicated, also connected to the lead 12. Similarly the sets of D. C. control apparatus associated with the lead 13 appertaining to the load 8 comprise respectively switches S2, S2', potentiometer P2 and resistance R2, and switches S'2, S'2', potentiometer P'2 and resistance R'2.

By way of indicating the mode of functioning of the apparatus, attention will now be drawn to effects which would result from the setting indicated of the various items whereby direct current is supplied for controlling the load transmitted through the thyratrons, a D. C. supply of 100 volts being assumed. Considering first the D. C. controlling apparatus associated with the load 7, as regards the application by means of the potentiometers P1 and P'1 respectively to the resistances R1 and R'1, it will be appreciated that the position of the sliding potentiometer contacts shown is the maximum in respect of P1 and the minimum as regards P'1. Neglecting the current in the grid circuit, it will be seen that the lead 12, that is to say the junction of the resistances R1 and R'1, will be at cathode potential inasmuch as the potentiometer p is in such a position that full voltage is being applied across the leads 17 and 18. On moving the contacts of potentiometer p to their other extreme position, the potential across the leads 17 and 18 is gradually altered to that of the cathode and full voltage is applied across the leads 15 and 16, with the result that the lead 12 will have a potential of 50 volts negative with respect to the cathode.

Considering now the D. C. control apparatus associated with the load 8, seeing that in the case of each of the potentiometers P2 and P'2 the sliding contact is at the mid point, when the potentiometer p is in the position drawn, both ends of the potentiometer P2 will be at cathode potential, and, on account of the high value of the resistance R2, the mid point may be regarded as also at cathode potential. The mid point of the potentiometer P'2, however, will be at a potential of 50 volts negative with respect to the cathode, and the lead 13, that is to say, the junction of the resistances R2 and R'2, will have a potential of 25 volts negative. If now the potentiometer p be adjusted so that 25 volts appear across the potentiometer P2 and 75 volts across P'2, the mid points of these potentiometers will be respectively at 12.5 and 37.5 volts negative with respect to the cathode, the lead 13 remaining at 25 volts. In other words, the potentiometers P' and P'2 being at midpoint adjustment, this latter voltage remains constant whatever the adjustment of the potentiometer p. Similarly it can be shown that, when the moving contacts on the potentiometers P2 and P'2 are set at different positions, the time taken for the output voltage change from one value to the other is that required for traversing the moving contacts of the potentiometer p from one extreme to the other. Moreover, the various adjustable items in the chain which, for the time being, is de-energized, may be actuated without affecting the output from the various sets of apparatus in the chain which is connected to the D. C. supply.

What I claim and desire to secure by Letters Patent of the United States is:

1. Apparatus for the control of stage, decorative and similar lighting devices fed with unidirectional current from a polyphase alternating-current supply, comprising in combination thermionic valves of the same number as that of the phases of the supply, a lead from each of said valves connecting its anode circuit in series with the lighting load, a single source of direct-current supply, a double-ganged potentiometer connected across said direct-current supply, two sets of apparatus, each set including two pressure leads whereof one of said leads is connected to one pole of said direct-current supply and the remaining pressure leads of the two sets are connected respectively to the two sliders of said double-ganged potentiometer, a potentiometer connected across the pressure leads of each of said sets of apparatus, two resistances connected in series between the sliders of the last mentioned potentiometers, and a lead from the junction of said resistances to the grid circuit of each of said valves.

2. Apparatus for the control of stage, decorative and similar lighting devices fed with unidirectional current from a polyphase alternating-current supply, the said lighting load being divided into at least two sections, comprising in respect of each section the combination of thermionic valves of the same number as that of the phases of the supply, a lead from each of said valves connecting its anode circuit in series with said lighting load section, a single source of direct-current supply, a double ganged potentiometer connected across said direct-current supply, two sets of apparatus in respect of each lighting load section, each set including two pressure leads whereof one of said leads is connected to one pole of said direct-current supply and the remaining pressure leads of the two sets are connected respectively to the two sliders of said double-ganged potentiometer, a potentiometer connected across the pressure leads of each of said sets of apparatus, two resistances connected in series between the sliders of the last mentioned potentiometers, and a lead from the junction of said resistances to the grid circuit of each of said valves appertaining to said lighting load section.

JAMES TEMPLETON WOOD.

REFERENCES CITED

The following references are of record in the file of this patent:

UNITED STATES PATENTS

| Number | Name | Date |
|---|---|---|
| 2,190,757 | Moyer | Feb. 20, 1940 |
| 2,242,105 | Brettel, Jr. | May 13, 1941 |
| 2,278,211 | Moyer | Mar. 31, 1942 |
| 2,366,537 | Livingston | Jan. 2, 1945 |